United States Patent [19]

Zhou

[11] Patent Number: 4,896,567
[45] Date of Patent: Jan. 30, 1990

[54] PLANETARY TRANSMISSION MECHANISM AND DEVICE OF INVOLUTE GEARS WITH COMPLEX MINOR TOOTH DIFFERENCE

[75] Inventor: Ganxu Zhou, Hunan, China
[73] Assignee: Hunan Research Inst. of Machinery, Hunan, China
[21] Appl. No.: 107,359
[22] Filed: Oct. 9, 1987
[30] Foreign Application Priority Data
  Jul. 18, 1987 [CN] China .................. 87102061
[51] Int. Cl.$^4$ .............................. F16H 1/28
[52] U.S. Cl. .................... 74/804; 74/750 R
[58] Field of Search .......... 74/805, 804, 801, 750 R
[56] References Cited

U.S. PATENT DOCUMENTS

| 2,250,259 | 7/1941 | Foote, Jr. .................. 74/805 |
| 3,129,611 | 4/1964 | Lee .......................... 74/804 |
| 3,448,638 | 6/1969 | Zahlaus ...................... 74/804 |
| 3,965,774 | 6/1976 | Omi et al. ................... 74/805 |
| 3,994,187 | 11/1976 | Milenkovic .................. 74/804 |
| 4,656,891 | 4/1987 | Durand ....................... 74/804 |
| 4,679,465 | 7/1987 | Goto et al. ............... 74/804 X |
| 4,762,025 | 8/1988 | Lew .......................... 74/804 |

FOREIGN PATENT DOCUMENTS 1904039  9/1969  Fed. Rep. of Germany ........ 74/804

Primary Examiner—Dwight G. Diehl
Attorney, Agent, or Firm—Michael N. Meller

[57] ABSTRACT

A planetary transmission mechanism and device of involute gears with compound small tooth-difference has two internal gear drives, an eccentric shaft with two eccentric axles and a rotational delivery mechanism with the gear pair's tooth-difference optimally equal to 5 to 8 teeth. The internal gear drives comprise at least two pairs of gears, the planetary gear of each gear drive being rotatably sleeved on a respective eccentric axle of the eccentric shaft.

11 Claims, 15 Drawing Sheets

PLANETARY TRANSMISSION MECHANISM AND DEVICE OF INVOLUTE GEARS WITH COMPLEX MINOR TOOTH DIFFERENCE

BACKGROUND OF THE INVENTION

This invention relates to an involute gear planetary transmission mechanism, or more specifically relates to an involute gear small tooth-difference planetary transmission mechanism.

The prior art involute gear small tooth-difference planetary transmission mechanisms with the same transmission ratio adopt the same tooth-difference, same module and same eccentricity. And the application of gear correction to prevent various interferences causes an increase in mesh angle and radial load on the rotor bearings and reduces its transmission efficiency and service life. Most structures of such prior art techniques find difficulties in solving the dynamic balancing, are disadvantageous in implementing a transmission ratio of seriation product design and manufacture in terms of preferential number series, and thus were confined solely to reducer transmission.

BRIEF SUMMARY OF THE INVENTION

The object of the present invention is to provide a novel planetary transmission mechanism of involute gears with compound small tooth-difference that incorporates broad and precise transmission ratios favorable for carrying out transmission ratio seriation product design and manufacture in terms of preferential number series.

A further object of the present invention is to provide a system that does not require gear correction and incorporates a standard angle of mesh to increase meshing efficiency and decrease radial load on the rotor arm bearings.

A further object of the present invention is to provide the mechanism with a simple construction and ease of carrying out dynamic balancing.

A further object of the present invention is to apply the mechanism to construct various planetary transmission devices with involute gears of compound small tooth-differences.

The foregoing objects of the present invention are implemented as follows. The involute gear planetary transmission mechanism with compound small tooth-difference incorporates two or more than two internal gear drives, and the planet gear of each are rotatably mounted on two eccentrics of an eccentric shaft used as input drive. The two planet gears are connected through a rotational transmission mechanism and the internal gear of one pair of the internal gear drives is stationary, whereas the internal gear of the other pair of same is integrated with the output shaft. When incorporating more than two pairs of internal gears, two or more internal gears are stationed alternatively whereas another internal gear is integrated with the output shaft. The tooth-difference, module and corresponding eccentricity of the eccentrics of the internal gear drives can be different.

The internal gear drives can be spur gears or cycloidal gears or Wilhaber Novikov gears with a tooth-difference preferably of 5 to 8 teeth.

The planetary transmission mechanism of involute gears with compound small tooth-difference can be used as a basic unit with its eccentric shaft connected with the input gear box to form planetary transmission boxes of involute gears with compound small tooth-difference that meet various applications and are applicable in horizontal, erected, elevated and lateral positions.

The advantages of the present invention are obvious.

The transmission ratio of the present invention is broad and precise, allowing implementing transmission ratio seriation product design and manufacture in terms of preferential number series, rendering options among the great many combinations of transmission ratio for one having high transmission efficiency and rational construction of the gear box. A transmission ratio from 1:28 to 1:280 and transmission efficiency of 99% to 94% can be obtained.

All transmission ratios of the mechanism of the present invention are achievable with the application of the combination of standard cylindrical spur gears and the radial load on the rotor bearings on the eccentrics can be reduced by a factor of 2.5 in comparison with conventional involute same tooth-difference planetary transmission, thus extending the service life of the bearings, eliminating the complicated calculation of the gear correction, simplifying the construction of the gear box, minimizing the volume and weight of same and facilitating manufacturing, installation and maintenance.

The planetary gear drive mechanism of the present invention provides balanced stable transmission with low noise level of 58–80 dB at an input speed below 1800 r.p.m.

The construction of the involute planetary gear transmission box with compound small tooth-difference in accordance with the invention has the merits of simple construction, good processing performance, incorporating standard involute gears, avoiding the necessity of paired machining for the planetary gears, no restrained condition for assembly, being adaptable to standard bearings and high interchangeability of parts.

The transmission box of the present invention has large load carrying capacity, long service life and wide varieties of connection methods for installation. Each model of the device has, in addition to a total of 80 nominal transmission ratios within 1:20–1:2,000, 1:10–1:4,000,000 optional transmission ratios, 16 torque scalings, 60–100,000 Nm transmission torque and 0.06–200 Kw transmitted power at the user's option.

The transmission box of the present invention can conveniently be adapted to multi-speed transmission combination with multi-speed motors or stepless variable drive. It has a broad range of speed changes with minimum mechanical characteristic alteration and facilitates automatic control for gear motor multi-speed transmission.

DETAILED DESCRIPTION OF THE PREFERRED EMBODIMENTS

Now, with reference to the attached drawings, the details of some preferred embodiments of the present invention will be given.

Figure 1:
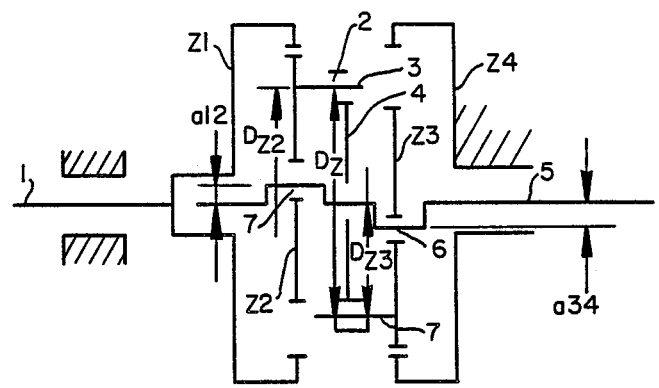
FIG. 1 is the principle diagram of the planetary transmission mechanism of involute gears with compound simple tooth-difference in accordance with the invention, incorporating a drive disk rotational delivery mechanism.

As shown in FIG. 1, the eccentric shaft (5) has two eccentrics (6,7), an internal gear $Z_4$ is stationary, a planet gear $Z_3$ is loose sleeved on an eccentric (6) forming a running fit to each other; planet gear $Z_3$ meshes with internal gear $Z_4$; another planet gear $Z_2$ is loose sleeved on the eccentric (7) forming running fit to each other; internal gear $Z_1$ and planet gear $Z_2$ mesh, an output shaft (1) is stationarily fixed integrally with the internal gear $Z_1$ and is coaxial with the eccentric shaft (5). The drive disk rotational delivery mechanism consists of a drive disk (4) and pin axles (3,7) fixed on the gears $Z_2$ and $Z_3$. The drive disk (4) floats on the intermediate journal of the eccentric shaft (5) and there are n pin holes (2) evenly distributed along circle $D_2$, whereas n pin axles (3,7) are evenly distributed and fixed on the circles $D_{Z_2}$ and $D_{Z_3}$ of $Z_2$ and $Z_3$ and inserted into the pin holes (2) of the drive disk as well.

There are generally five relationships for selection of the optimal combinations of transmission ratio for rational construction, namely:

$$Z_1 - Z_2 > Z_4 - Z_3, m_{12} = m_{34} a_{12} > a_{34}; \quad (1)$$

$$Z_1 - Z_2 > Z_4 - Z_3, m_{12} \neq m_{34} a_{12} \neq a_{34}; \quad (2)$$

$$Z_1 - Z_2 > Z_4 - Z_3, m_{12} < m_{34} a_{12} = a_{34}; \quad (3)$$

$$Z_1 - Z_2 > Z_4 - Z_3, m_{12} \neq m_{34} a_{12} \neq a_{34}; \quad (4)$$

$$Z_1 - Z_2 > Z_4 - Z_3, m_{12} = m_{34} a_{12} = a_{34}; \quad (5)$$

Where $Z_1$, $Z_2$, $Z_3$, $Z_4$ refer to numbers of teeth of the corresponding gears, and $m_{12}$-module of gears $Z_1$ and $Z_2$;
$m_{34}$-module of gears $Z_3$ and $Z_4$;
$a_{12}$-eccentricity of gear pair $Z_1$, $Z_2$;
$a_{34}$-eccentricity of gear pair $Z_3$, $Z_4$.

Meanwhile it should be noted that $d_2 = D - 2a_{12} - \delta$,
$d_3 = D - 2a_{34} - \delta$,
$D_{Z_2} = D_{Z_3} = D_Z$.

Where
- $d_2$ - pin sleeve diameter of the pin axle on gear $Z_2$;
- $d_3$ - pin sleeve diameter of the pin axle on gear $Z_3$;
- D - diameter of the pin hole on the drive disk; - tolerance for machining and assembly
- $D_{Z2}$- diameter of the circle of distribution of pin axle on gear $Z_2$;
- $D_{Z3}$- diameter of the circle of distribution of pin axle on gear $Z_3$;
- $D_Z$- diameter of the circle of distribution of the pin hole on the drive disk.

The above mechanism works as follows:

When rotational motion is produced by eccentric shaft (5), the planet gear $Z_3$ rotates to cause gear $Z_2$ to rotate through the drive disk rotational delivery mechanism. Thus an output of reduced speed is delivered through gear $Z_1$, which is internally meshed with $Z_2$, and the output shaft (1).

Figure 2:
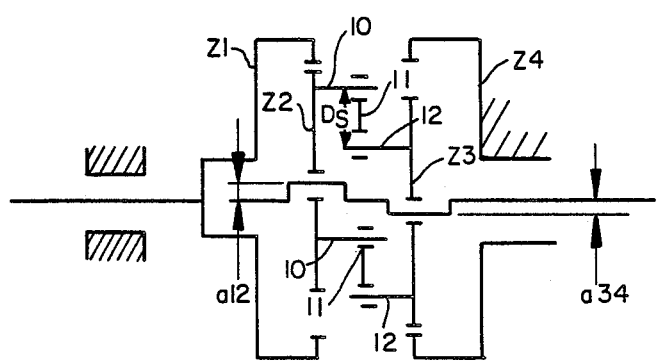
FIG. 2 is the principle diagram of the planetary transmission mechanism of involute gears with compound simple tooth-difference in accordance with the invention, incorporating a planetary rotational delivery mechanism.

The transmission mechanism shown in FIG. 2 is similar to that shown in FIG. 1 with the only difference being its incorporation of a planetary rotational delivery mechanism. The planetary rotational delivery mechanism consists of a planet gear (11) and pin axles (10,12), which are evenly distributed along the circle of distribution of the pin axles on gears $Z_2$ and $Z_3$. The planet gear (11) is a flat cylinder (or other shapes) with two holes symetrically opened on its diameter. The pin axles (10,12) are correspondingly inserted into the holes, forming running fit relation therein. Their geometric sizing relation should obey the following formulas:

$$D_S = a_{12} + a_{34};$$

$$D_{Z2} = D_{Z3} = D_Z.$$

Where
- $D_S$-center distance between the two holes on the planet gear;
- $D_Z$-diameter of the orbit circle formed by the revolution of the center of the planet gear around the center of the reducer;
- $D_{Z2}, D_{Z2}$, as defined in the mechanism shown in FIG. 1.

Figure 3:
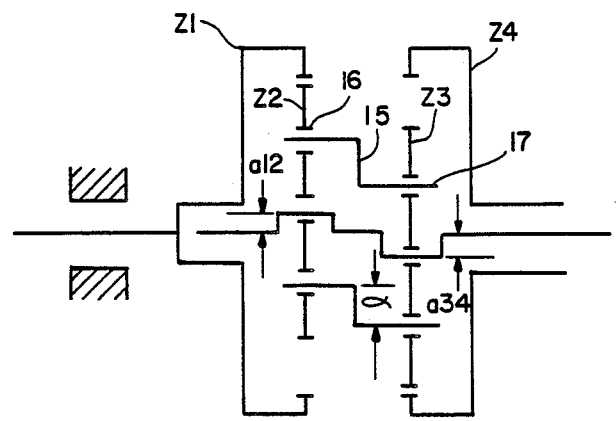
FIG. 3 is the principle diagram of the planetary transmission mechanism of involute gears with compound simple tooth-difference in accordance with the invention, incorporating a crank rotational delivery mechanism.

The transmission mechanism shown in FIG. 3 is similar in construction to that shown in FIG. 1 with the only difference being its incorporation of a crank rotational delivery mechanism. The crank rotational delivery mechanism consists of a crank (15) and crank holes (16, 17) opened on the gears $Z_2$ and $Z_3$. The crank holes (16, 17) are evenly distributed along the circles of distribution of the crank holes of gears $Z_2$ and $Z_3$. Some crank axles of the crank (15) are respectively inserted into the corresponding crank holes (16, 17) in running fit. Their geometric sizing relation should obey the following formulas:

$$L = a_{12} + a_{34};$$

$$D_{Z2} = D_{Z3} = D_Z.$$

Where
- L—distance between the two axes of the crank axles.
- $D_Z$—diameter of the concentric circle formed by the rotation of the crank center around the crankshaft;
- $D_{Z2}$—diameter of the circle of distribution of the crank hole on the gear $Z_2$;
- $D_{Z3}$—diameter of the circle of distribution of the crank hole in the gear $Z_3$; and
- $a_{12}$ and $a_{34}$ as defined above.

Figure 4:
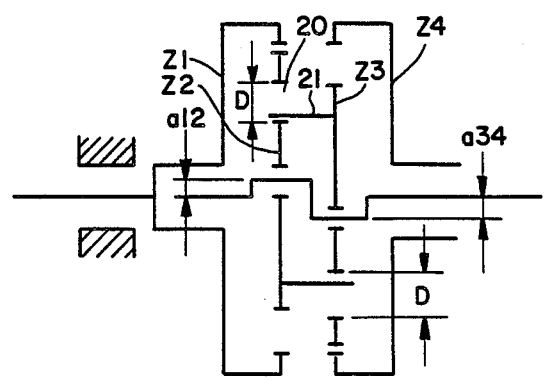
FIG. 4 is the principle diagram of the planetary transmission mechanism of involute gears with compound simple tooth-difference in accordance with the invention, incorporating pin axle and pin sleeve rotational delivery mechanism.

The mechanism shown in FIG. 4 is similar in construction to that shown in FIG. 1 with the only difference being its incorporation of a pin axle and pin sleeve rotational delivery mechanism. The pin axle and pin sleeve rotational delivery mechanism consists of pin axles (21) and pin holes (20) on the gears $Z_2$, $Z_3$. The pin holes (20) are evenly distributed along the circles of distribution of the pin holes of the gears $Z_2$ and $Z_3$. The pin axles (21) are evenly fixed on the circles of distribution of the pin axles on gears $Z_2$ and $Z_3$ and are inserted into the corresponding pin holes (20). Their geometric sizing relation should obey the following formula:

$$D = d_T + a_{12} + a_{34} \delta.$$

where
- D - diameter of the pin holes on gears $Z_2$, $Z_3$;
- $d_T$ - diameter of the pin sleeves on the pins fixed to gears $Z_2$, $Z_3$;
- $a_{12}$, $a_{34}$ and $\delta$ as defined above. FIG.1 to FIG. 4 show four kinds of intermediate delivery mechanisms with stable drive. The gears $Z_2$ and $Z_3$ can also provide rotational delivery by means of a crossed slide block and cross-grooved float disk, but a centrifugal load may occur during operation and vibration will likely be produced at high speed. Between gears $Z_2$ and $Z_3$, a zero tooth-difference gear pair can be used for connection, such as to incorporate an internal gear $Z_6$ at the side face of the planet gear $Z_3$ and an external gear $Z_5$ at the side face of the planet gear $Z_2$ and then to mesh $Z_5$ with $Z_6$ while $Z_6 - Z_5 = 0$. Thus, driven by gear pair $Z_6$, $Z_5$, a rotational motion will be delivered by $Z_3$ to $Z_2$ at a ratio of 1:1 and, by meshing $Z_2$ with $Z_1$, an output motion can be obtained. But, using a drive of zero tooth-difference as the connection mechanism of $Z_2$ and $Z_3$ may complicate the processing and calculation and if $Z_6 = Z_5$, there will be another form of planetary transmission mechanism.

Figure 5:
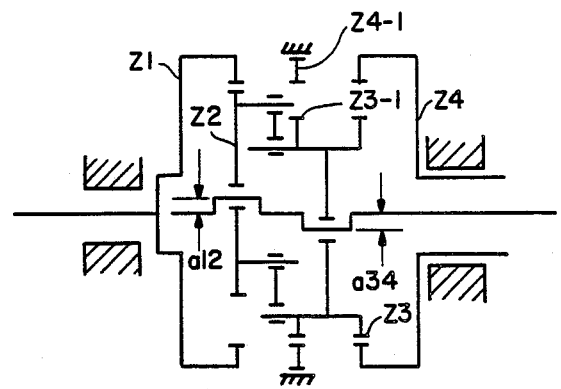
FIG. 5 is the principle diagram of the planetary change-speed transmission mechanism of involute gears with compound small tooth-difference in accordance with the invention, incorporating a planetary rotational delivery mechanism.

The mechanism of the present invention shown in FIG. 5 is a variation of the mechanism shown in FIG. 2. The internal gear drive $Z_1 Z_2$, the output shaft, the planetary rotational delivery mechanism and the eccentric shaft are all similar to those shown in Fig. 2. The dissimilarity is that the gear $Z_3$ in the mechanism shown in FIG. 2 becomes a stepped gear by combining $Z_3$ and $Z_{3-1}$, and $Z_4$ becomes two internal gears $Z_4$ and $Z_{4-1}$. $Z_{4-1}$ and $Z_{3-1}$ as well as $Z_4$ and $Z_3$ are respectively internally meshed. The gears $Z_{4-1}$ and $Z_4$ can be at stationary or in rotation by themselves. For instance, if $Z_{4-1}$ is stationary, then $Z_4$ may rotate, or vice versa. Thus, if $Z_{4-1}$ or $Z_4$ are stationary, two reductions of speed can be obtained.

Figure 6:
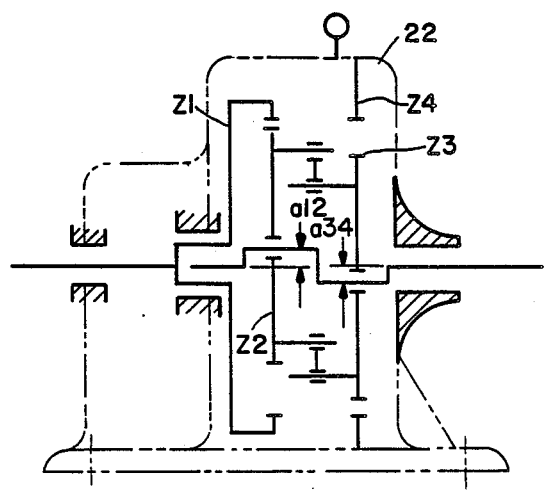
FIG. 6 is the principle diagram of the single-stage double-axle planetary reducer in accordance with the invention.

FIG. 6 shows a single-stage driving double-axle reducer made by utilizing the planetary mechanism of involute gears with compound small tooth-difference, wherein the internal gear drives of $Z_1 Z_2$ and $Z_3 Z_4$, the intermediate planetary rotational delivery mechanism, the eccentric shaft and the output shaft are similar to those of the mechanism shown in FIG. 2. The gear $Z_4$ is integrated with the reducer housing (22).

Figure 7:
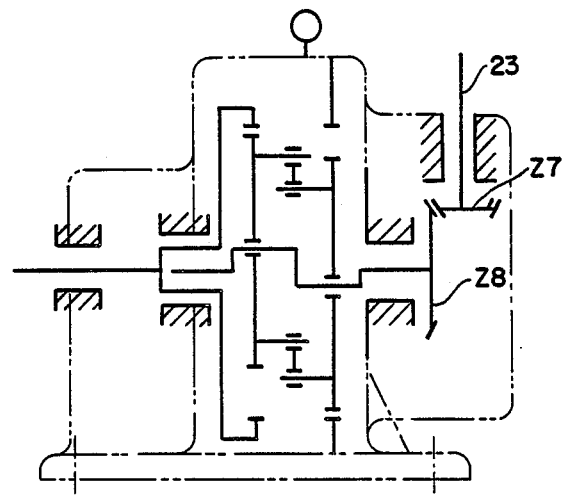
FIG. 7 is the principle diagram of the high-speed two-stage planetary reducer incorporating a helical bevel gear drive in accordance with the invention.

FIG. 7 shows a two-stage driving planetary reducer with an additional single-stage helical-bevel gear drive transmission mechanism attached to the single-stage driving double-axle reducer shown in FIG. 6. One end of the eccentric shaft is fixed to a helical-bevel gear $Z_8$; an input shaft (23) passes through the bearing hole of the gear box with its one end on the gear box mounted with a helical bevel gear $Z_7$ in mesh with $Z_8$. The rest of the construction is similar to that in the reducer shown in FIG. 6.

Figure 8:
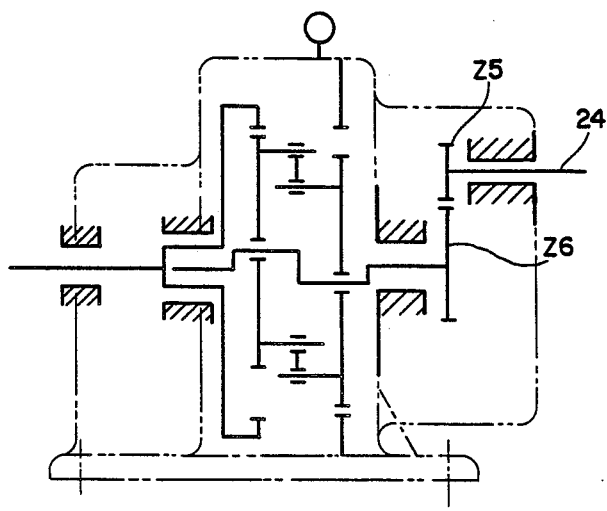
FIG. 8 is the principle diagram of the high-speed two-stage planetary reducer incorporating a skew gear drive in accordance with the invention.

FIG. 8 shows a two-stage planetary reducer with an additional driving of a single-stage helical gear drive attached to the singe-stage driving double-axle reducer shown in FIG. 6. The eccentric shaft is fixed at one end with a helical gear $Z_6$; an input shaft (24) passes through the bearing hole of the gearbox with its one end on the gear box mounted with a helical gear $Z_5$ in mesh with $Z_6$. The rest of the construction is similar to that of the reducer shown in FIG. 6.

Figure 9:
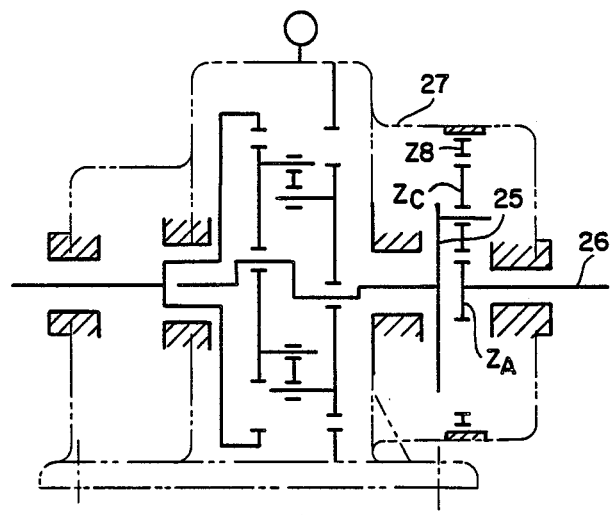
FIG. 9 is the principle diagram of the high-speed two-stage planetary reducer incorporating a planetary mechanism in accordance with the invention.

FIG. 9 shows a two-stage driving planetary reducer with an additional single-stage driving planetary transmission mechanism attached to the single-stage driving double-axle reducer shown in FIG. 6. The planetary transmission mechanism includes an internal gear $Z_B$ fixed to the housing, a planet gear $Z_C$ and a sun gear $Z_A$; an input shaft (26) passing through the bearing hole of the housing and connected with the sun gear $Z_A$; and an eccentric shaft connected with the planet gear $Z_C$ through an eccentric (25). The planet gear $Z_C$ can be made either of steel or high strength engineering plastic in order to achieve even loading and low noise. As an alternative, the internal gear $Z_B$ can be attached with an overload safety device before being fixed to the housing (27), so that in case of overloading, the internal gear $Z_B$ can be protected by its flotation relative to the housing (27) of the gear box.

Figure 10:
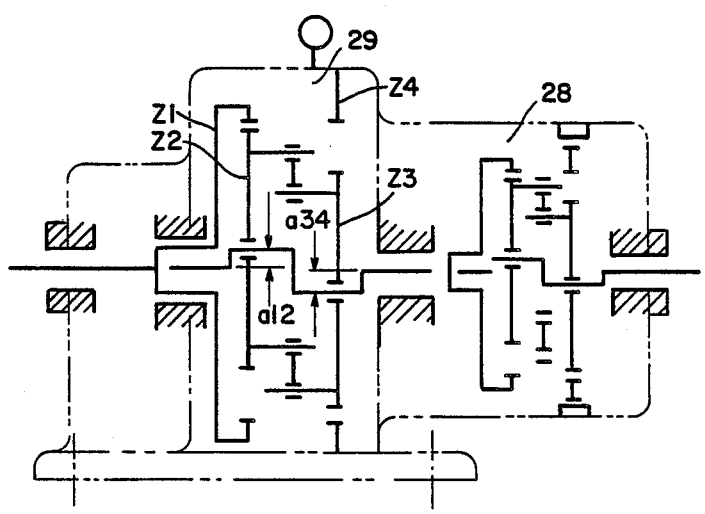
FIG. 10 is the principle diagram of the two-stage planetary reducer with tandem connection between the planetary reducers in accordance with the invention.

FIG. 10 shows a two-stage planetary reducer with two single-stage driving double-axle reducers (28,29) connected in tandem. Their construction has been shown in FIG. 2 and the slight modification is that the output shaft of one reducer is connected with the input shaft of the other.

Figure 11:
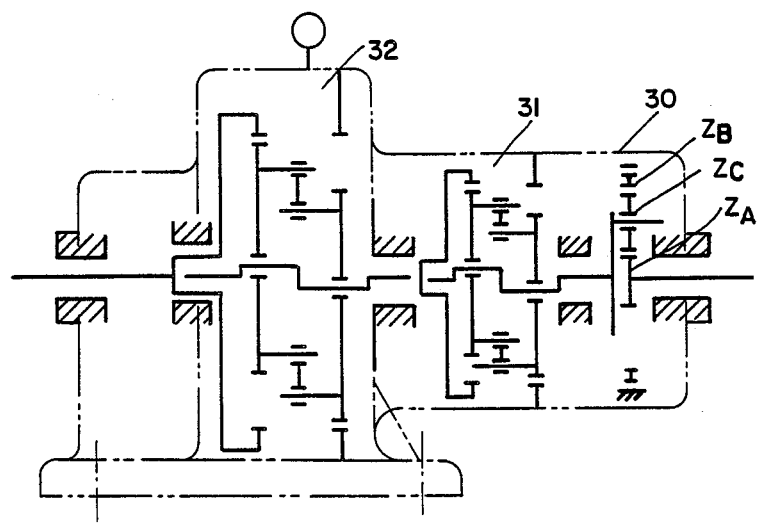
FIG. 11 is the principle diagram of the high-speed three-stage planetary reducer incorporating a planetary mechanism in accordance with the invention.

FIG. 11 shows a three-stage planetary reducer. The first-stage drive (30) is the planetary mechanism shown in FIG. 9, whereas the second and third-stage drives (31, 32) are formed by a tandem connection of the single-stage drive double-axle reducers shown in FIG. 6.

Figure 12:
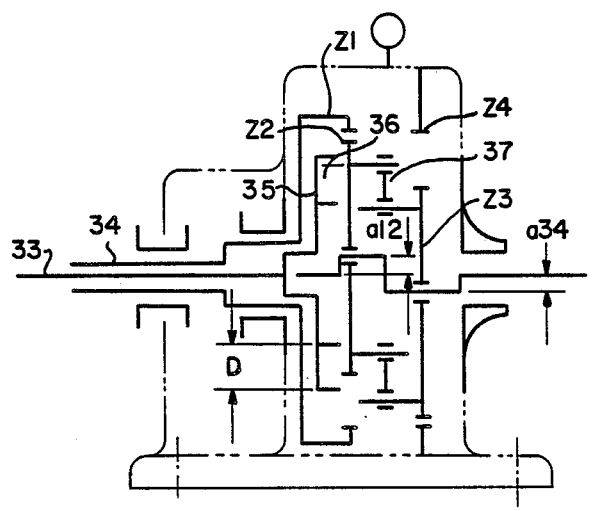
FIG. 12 is the principle diagram of the planetary reducer with simultaneous output of two rotational speeds in accordance with the invention.

FIG. 12 shows a planetary reducer with simultaneous output of two rotational speeds and its reducer mechanism consisting of two internal gear drives $Z_1$ $Z_2$ and $Z_3$ $Z_4$, an eccentric shaft and a planetary rotational delivery mechanism. The power outputs are delivered by output shafts. The construction of this reducer is similar to that of the reducer shown in FIG. 6. The output shaft (34) is a hollow sleeve. In addition, there is another output shaft (33) passing through the output shaft sleeve (34) with its one end fixed to a round disk (35), which has evenly distributed holes (36). One end of the pins of the planetary rotational delivery mechanism (37) is inserted into the pin holes of the planet gear whereas the other end is inserted into the hole of the round disk (36). Their geometric sizing should obey the following formula:

$$D_K = d_T + a_{12} + \delta$$

Where $D_K$-diameter of the hole on the round disk;
$d_T$-diameter of the pin sleeve for the pin on the planetary rotational delivery mechanism;
$a_{12}$ and $\delta$ as defined above.

Figure 13:
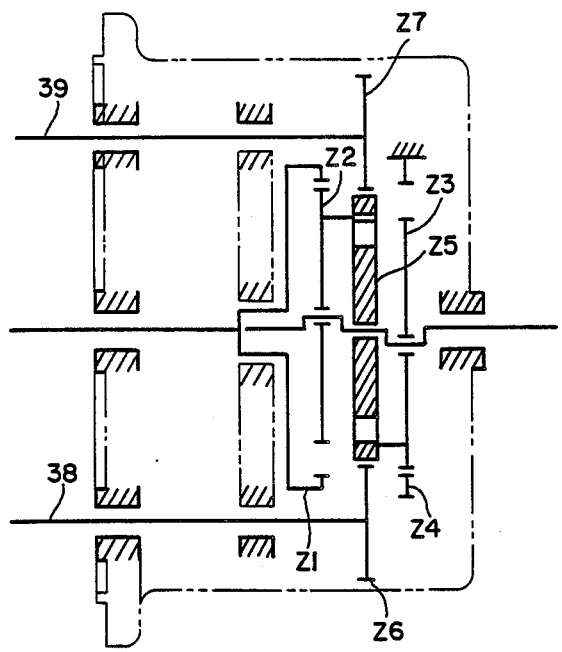
FIG. 13 is the principle diagram of the planetary reducer with simultaneous output of multiple rotational speeds in accordance with the invention.

FIG. 13 shows a planetary reducer of involute gears with compound small tooth-difference having simultaneous output of multi-rotational speeds and applying the drive disk rotational delivery mechanism as shown in FIG. 1, which consists of internal gear drives $Z_1$ $Z_1$ and $Z_3$ $Z_4$, an eccentric shaft, an intermediate drive disk rotational delivery mechanism and an output shaft. The characteristic of this construction is that the drive disk is also an external gear $Z_5$ and the other two output shafts (38, 39) are also passing through the bearing holes of the housing with their terminals fixed respectively to gears $Z_6$ and $Z_7$, in mesh with $Z_5$ (drive disk), so that this construction provides altogether three output shafts that can produce different ratios by changing the tooth number of $Z_5$, $Z_6$ and $Z_7$.

Figure 14:
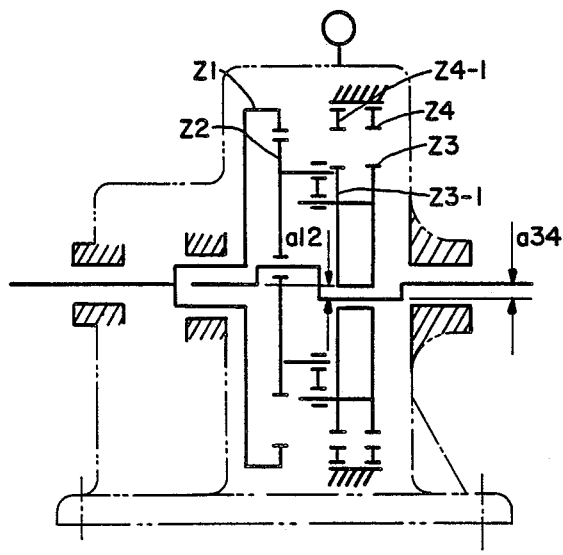
FIG. 14 is the principle diagram of the horizontal double-axle planetary transmission in accordance with the invention.

FIG. 14 shows a horizontal double-axle planetary speed transmission utilizing the speed change transmission mechanism shown in FIG. 5.

Figure 15:
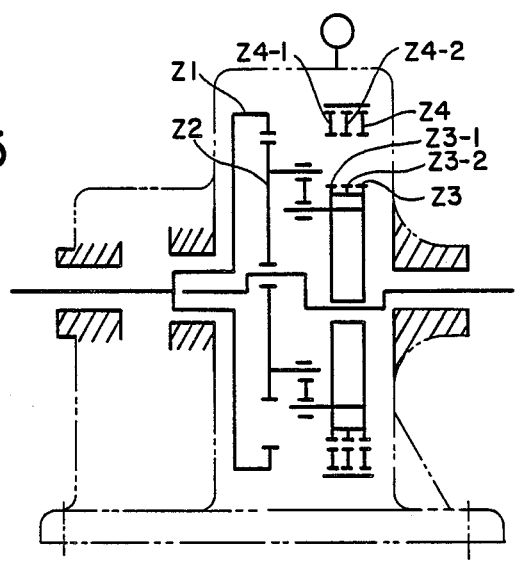
FIG. 15 is the principle diagram of the planetary transmission with three transmission ratios in accordance with the invention.

FIG. 15 shows a planetary speed transmission with three transmission ratios utilizing the speed change transmission mechanism shown in FIG. 5, with the only difference being its incorporation of three internal gears $Z_4, Z_{4-1} Z_{4-2}$, and triple external gears, $Z_3$, $Z_{3-1}$ and $Z_{3-2}$. Gears $Z_4$ and $Z_3, Z_{4-1}$ and $Z_{3-1}$, and $Z_{4-2}$ and $Z_{3-1}$ are respectively in mesh, and $Z_4, Z_{4-1}$ and $Z_{4-2}$ are, respectively, either stationary or rotating. If one of them is stationary, the others are idle. Thus, the transmission ratio $i_1$ is formed by $Z_1$, $Z_2$, $Z_{4-1}$ and $Z_{3-1}$, $i_2$ by $Z_1, Z_2, Z_{4-2}$ and $Z_{3-2}$ and $i_3$ by $Z_1$, $Z_2, Z_4$ and $Z_3$.

Similarly, more transmission ratios can be obtained by increasing the number of gear pairs.

Figure 16:
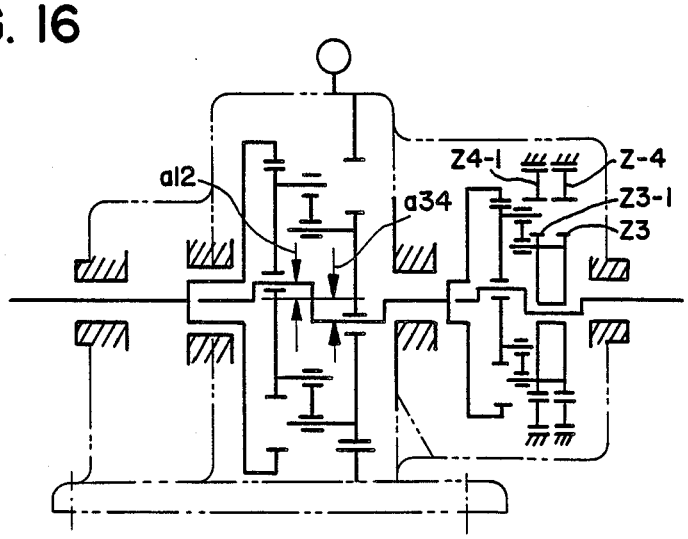
FIG. 16 is the principle diagram of the low-speed planetary transmission with tandem planetary reducer in low-speed stage in accordance with the invention.

FIG. 16 shows a planetary speed transmission formed by connecting two reducers of the type shown in FIG. 6 to the speed transmission shown in FIG. 14.

Figure 17:
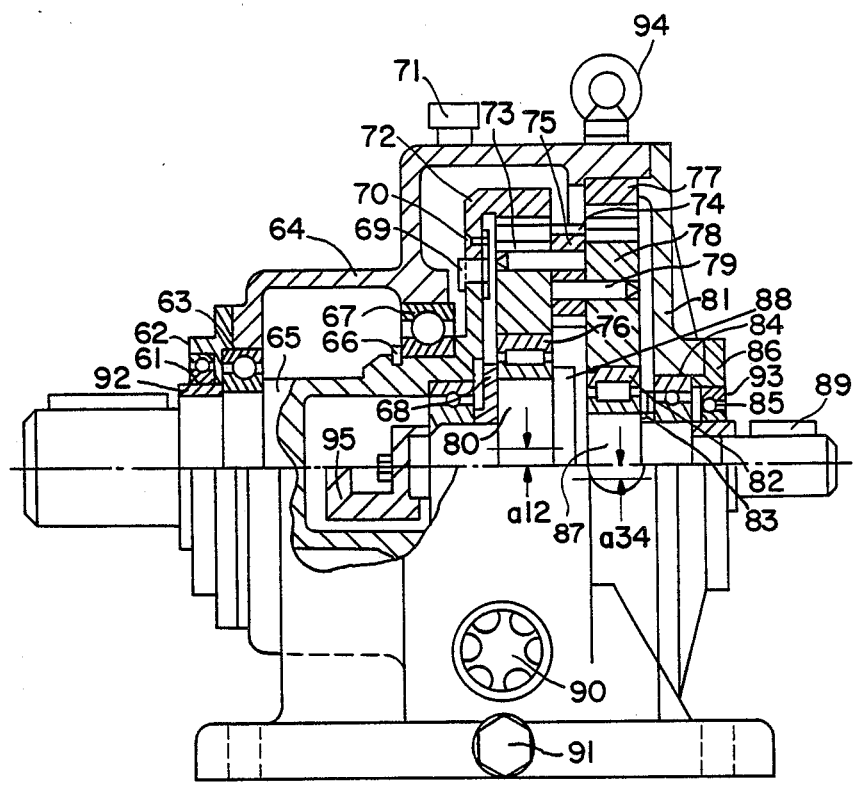
FIG. 17 is the constructional diagram of the horizontal double-axle planetary reducer in accordance with the invention.

FIG. 17 is the constructional diagram of the single-stage double-axle planetary reducer shown in FIG. 6. On the left side of the reducer housing (64) dual bearing holes are provided on which bearings (63) and (69) are mounted and the dual journals of the output shaft (65) are respectively inserted into the inner holes of the bearings (63) and (67) with transition fit. An end cap (62) packed with seal (61) is screwed onto the housing (64) to assure axial pressure upon a bearing (65). A grip ring (92) mounted on an output shaft (65) restrains the inner collar of the bearing (63) from moving axially, and outside the grip ring (92) seal (61) is packed. The right end of the output shaft is in the form of a flange integrally riveted to the internal gear (22) by rivet (70) and joined by saddle key (69) so that large torque can be transmitted. At the center of the output shaft flange is a recess structure with a bearing (66) mounted therein. The journal of one end of the eccentric shaft (88) is inserted into the inner race of the bearing (66) and the journal of the other end is mounted with a bearing (85), which is located within a hole (84) as the bearing seat in an end cap (81) screwed to the housing (64). An end cap (86) is screwed on the end cap (81) and pressed upon the bearing (85). The end cap (86) with seal (93) is internally packed and the eccentric shaft (88) incorporates two eccentrics (80, 87) with eccentricities $a_{12}$ and $a_{34}$ respectively. On the eccentrics (80, 87) are respectively mounted bearings (76,82) on which are mounted planetary gears (78). An internal gear (77) is fitted into the internal gear ring base of the housing (64) and fastened therein by dowel pins (not shown in the diagram). The surface of the end cap (81) is pressed against the internal gear (77). Planet gears (73) and (78) are respectively in mesh with the internal gears (72) and (77). Between bearings (66) and (76) and bearings (82) and (85), bearing retainer rings (68) and (83) are respectively disposed. Between the planet gears (73) and (78) is mounted a planetary rotational delivery device which consists of a pin (79), a planet wheel (75) and a nylon cover (74) (details of which will be given later in this description). At the right end of the eccentric shaft (88) is a key slot with key (89) inserted therein. On the housing (64) are provided a hoisting eyelet (94), an oiling hole and vent plug (71), a drainage hole and plug (91) and a lubrication peephole (90). The bearings (66) and (85) may either be spherical roller bearings or stub cylindrical roller bearings. The bearings (76) and (82) are stub cylindrical roller bearings. The input end of the eccentric shaft (88) and the end of the output shaft (65) can also have, in addition to the aforementioned plain key, an inner hole-and-key groove or spline hole, or otherwise transverse grooved end face and expansion joint bushing. For driving with relatively large power, an adjustable or stationary balancer (95) should be added to the left end of the high-speed rotating eccentric shaft (88) of the singe-stage planetary reducer (i.e., the speed transmission) in order to achieve dynamic balancing and smooth operation for the transmission device.

Figure 18:
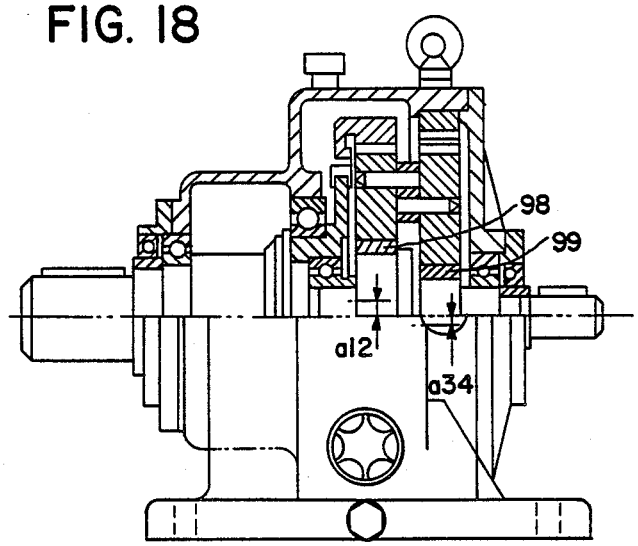
FIG. 18 is the constructional diagram of the planetary reducer with rotor arm using slide bearings in accordance with the invention.

The reducer shown in FIG. 18 is the singe-stage double-axle planetary reducer shown in FIG. 17 with its roller bearings (76) and (82) replaced by slide bearings (98) and (99).

Figure 19:
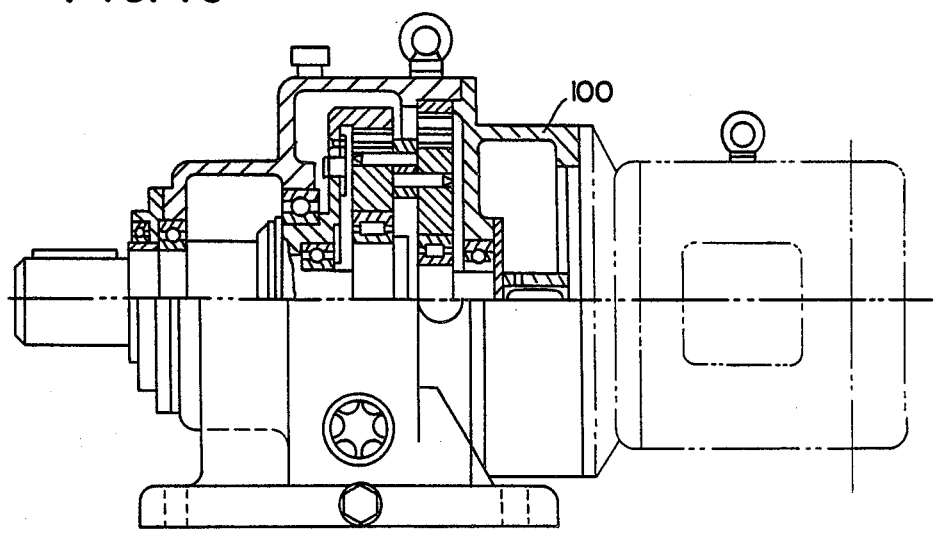
FIG. 19 is the constructional diagram of the planetary reducer with motors in series connection in accordance with the invention.

The reducer shown in FIG. 19 is the single-stage double-axle planetary reducer shown in FIG. 17 with its end cover replace by a motor base (100), whereon a flange motor is installed.

Figure 20:
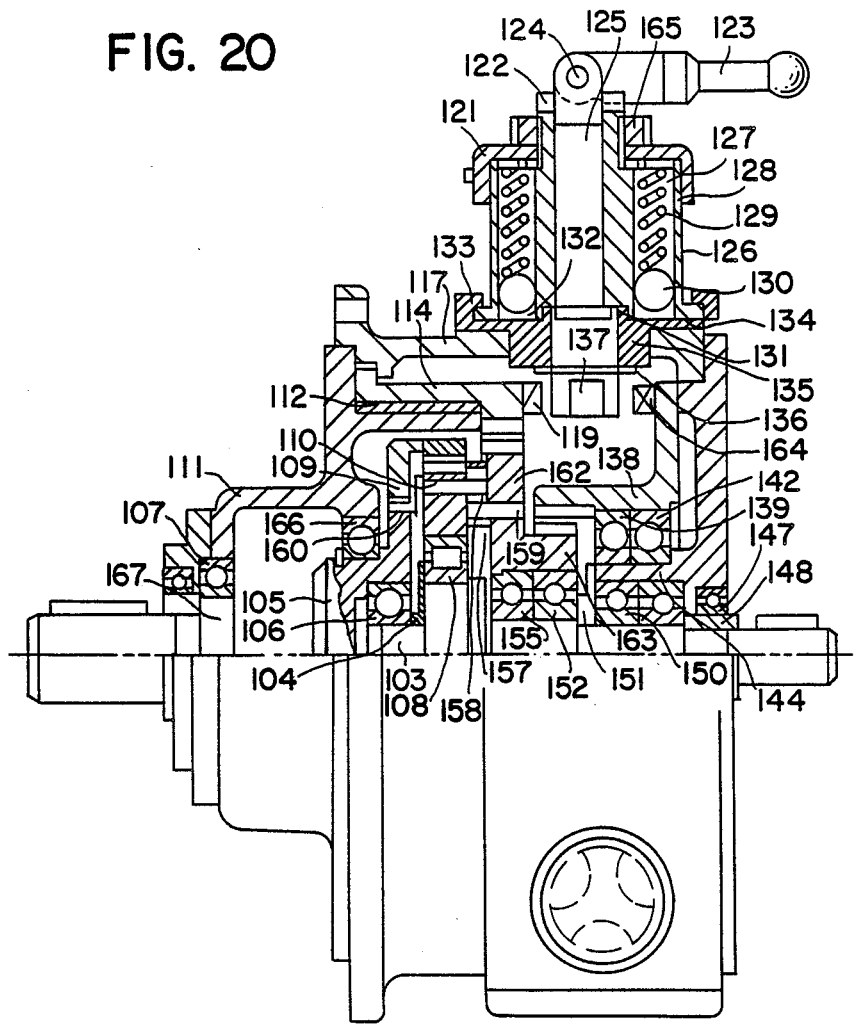
FIG. 20 is the constructional diagram of the planetary transmission in accordance with the invention.

As shown in FIG. 20, the planetary gear speed transmission consists of a housing (117), a bearing seat (111) fixed on the housing (117) by screws and two roller bearings (107) and (106) which are single-row annular ball bearings mounted in the bearing seat (111). Cylindrical shoulders (105) and (167) of an internal gear (109) are mounted in the bearings (107) and (106). The bearing (106), which may be a single-row annular ball bearing or a double-row spherical roller bearing, is mounted in a recess concentric with the shoulder (105) located in the internal gear (109). The journal of one end of the eccentric shaft (1103) with two eccentrics is mounted in the inner race of the bearing (106). The eccentricities of the eccentrics are $a_{12}$ and $a_{34}$ respectively. On the eccentric shaft of eccentricity $a_{12}$ is mounted a bearing (108) which may be a cylindrical roller bearing. A retainer collar (104) made of nylon is fitted between the bearing (106) and bearing (108), on which is mounted a planet gear (110) in mesh internally with an internal gear (109). On the shoulder of the bearing seat (111) is mounted a sleeve (112) which is concentric with the eccentric shaft and fastened to an internal gear (114) that incorporates face clutch teeth (119). The sleeve (112) is cut to form a circular oil slot and oil hole (not shown in the diagram) and the internal gear (114) is similarly cut (not shown in the diagram). The internal gear (114) and sleeve (112) are in running fit relative to the bearing seat (111). The material of the sleeve (112) may be nonferrous metal. On the eccentric of eccentricity $a_{34}$ are mounted in parallel two bearing (155) and (152), which may be ball bearings with a spacer retainer there between. On the outer races of the two bearings (155) and (152) are mounted gears (162) and (163), which may either be integral stepped gears as shown in the diagram or a composite with the gear (162) sleeved on the shoulder of the gear (163) and fixed together by a dowel pin. The gear (162) meshes with the internal gear (114). On the journal of eccentric shaft (103), two bearings (150) are mounted on the eccentric of eccentricity $a_{34}$. The bearings (150) are in turn mounted in a bearing seat (144) at the right side of the housing (117). The outer face of the bearing (150) rests against the retaining shoulder of the bearing seat (144), and between the outer faces of the bearing (150) and bearing (152) is disposed retainer collars (151), which may be made of nylon. A gripping sleeve (148) packed with an oil seal (147), is mounted on the journal of the eccentric shaft (103) and is pressed against the inner face of the bearing (150). The two bearings (150) may be roller bearings. Outside of the right bearing seat (144) are mounted coaxially to the eccentric shaft (103) bearings (139) and (142) with a retaining collar therebetween. The bearings (139) and (142) may be journal bearings, outside of which are mounted an internal gear (138) in mesh with the planet gears (163). The end face of gear (138) incorporates end face clutch teeth (164) that correspond to the end face clutch teeth (119) on the gear (114).

A semi-clutch (126) is mounted on the outer side of the housing (117) and its rotor shaft (125) passes through a hole on a disk (134) with running fit therein. Through a shoulder (136) of the rotor shaft (125) and the spring retaining collar (131), the rotor shaft (125) is restrained from moving axially but is free to rotate. The shoulder (135) of the disk (134) is mounted in the hole on the housing (117), so that one end of the rotor shaft (125) with block (137) enters between the end face clutch teeth (119) and (164) of the gears (114) and (138). The rotor shaft (125) is fitted with a spring seat (128), at the internal circumference of which are evenly distributed several longitudinal through holes (127), wherein steel balls (130) and its retaining spring (129) are mounted. The top of the spring seat (128) is provided with circumferentially distributed notches (122). A spring shield (121) which has notches corresponding to notches (122) is precisely slipped into the top of the spring seat (128) and, by means of the adjusting nut (165), may be joined to the spring seat (128) to allow only longitudinal movement without rotation by means of which the spring (129) is pressed or released. A pressing cover (133) keeps the spring seat (128) on the disk (134) to rotate without longitudinal movement, and is screwed on the housing (117) along with the disk (134). The steel balls (130) are pressed into the positioning groove (132) of the disk (130) under pressure of the spring (129). A handle (123) is mounted in an upper groove of the rotor shaft (125 and is rotatable about the pin (124) as its pivot. If the handle is set down, it gets stuck in the notches (122). When the block (137) gets in the way of the end face clutch teeth (119) or (164), the internal gear (114) or (138) works and the overloaded block automatically disengages.

The other ends of some of the pin axles (160) and (159) are inserted into the round holes of the planet gear (158) with running fit and gear (158) is covered by nylon shield (157). Pin axles (160) and (159) and planet gear (158) form the planetary rotational delivery mechanism (the specific construction of which will be detailed later in this description).

Figure 21:
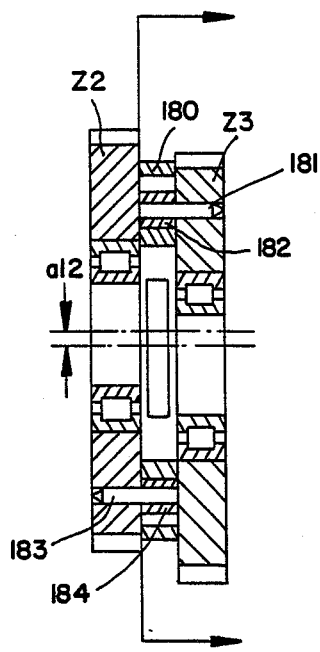
FIG. 21 is the front sectional view of the drive disk rotational delivery mechanism in accordance with the invention.
Figure 22:
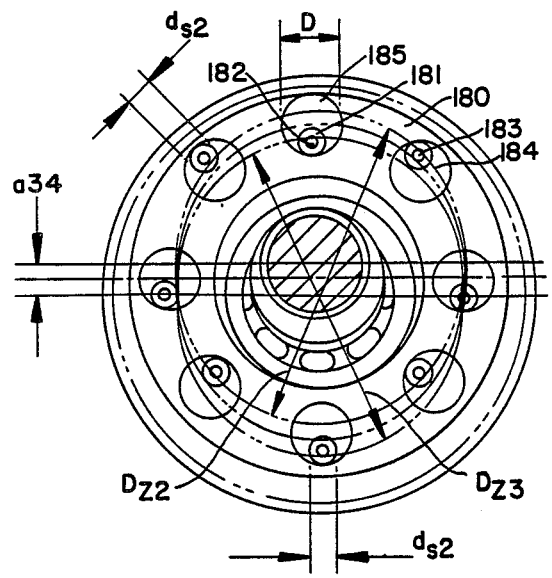
FIG. 22 is the side view of the mechanism shown in FIG. 21.

FIGS. 21 and 22 show a kind of drive disk rotational delivery mechanism. The gears $Z_2$ and $Z_3$ are respectively mounted on two eccentric bearings of eccentrics with their respective eccentricities $a_{12}$ and $a_{34}$. There are eight holes (185) with diameter D evenly distributed along the circumference $D_Z$ of the drive disk (180).

Four cylindrical pin axles (181) are pressed into the holes on the side surface of the gear $Z_3$ with interference fit. The holes are evenly distributed along a circumference concentric with the gear $Z_3$ with a diameter $D_{Z3}$. Sleeves (182) are sleeved on the cylindrical pins (181). Four cylindrical pins (183) are pressed into the holes on the side surface of the gear $Z_2$ with interference fit. The holes are evenly distributed along the circumference with diameter $d_{Z2}$ concentric with the gear $Z_2$. Sleeves (184) are sleeved on the cylindrical pins (183). The drive disk (180) is put between the gears $Z_2$ and $Z_3$ and the eight pin axles and sleeve (182) and (184) are respectively inserted into the eight holes (185) of the drive disk. The sizing relations between them should obey the following formulas:

$$d_{S2} = D - 2a_{12} - \delta;$$

$$d_{S3} = D - 2a_{34} - \delta;$$

$$D_{Z2} = D_{Z3} = D_Z.$$

Where
$d_{S2}$—diameter of sleeve on the gear $Z_2$;
$d_{S3}$—diameter of sleeve on the gear $Z_3$;
D—diameter of hole on the drive disk;
$D_{Z2}$—diameter of the distribution circle of the pin on the gear $Z_2$;
$D_{Z3}$—diameter of the distribution circle of the pin on the gear $Z_3$;
$D_Z$—diameter of the distribution circle of the pin holes in the drive disk;
$\delta$—tolerance for machining and assembly.

Figure 23:
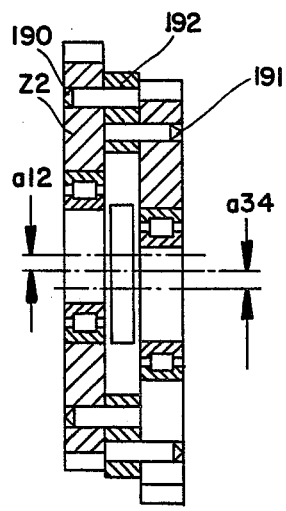
FIG. 23 is the front sectional view of the planetary drive delivery mechanism in accordance with the invention.
Figure 24:
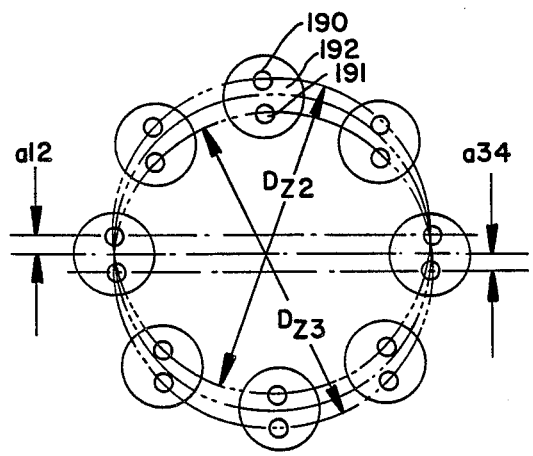
FIG. 24 is the side of the mechanism shown in Fig. 23.

FIGS. 23 and 24 show the construction of the planetary rotational delivery mechanism. The gears $Z_2$ and $Z_3$ are respectively mounted on two eccentric bearings of eccentrics with respective eccentricities $a_{12}$ and $a_{34}$. The cylindrical pins (190) and (191) are respectively pressed into holes on the side surface of gears $Z_2$ and $Z_3$ and with interference fit. The holes are evenly distributed along the circumferences formed by diameters $D_{Z3}$ and $D_{Z2}$ respectively. The other ends of pins (190) and (191) are respectively pressed into two holes on a flat cylinder planet gear (192) with running fit. The sizing relations between them should obey the following formulas:

$$D_S = a_{12} + a_{34};$$

$$D_{Z2} = D_{Z3} = D_Z.$$

Where
$D_S$—center distance between the two holes on the planet gear;
$D_{Z2}$—diameter of the distribution circle of pin on the gear $Z_2$;
$D_{Z3}$—diameter of the distribution circle of pin on the gear $Z_3$;
$D_Z$—diameter of the orbital circle formed by the revolution of the center of the planet gear.

Figure 25:
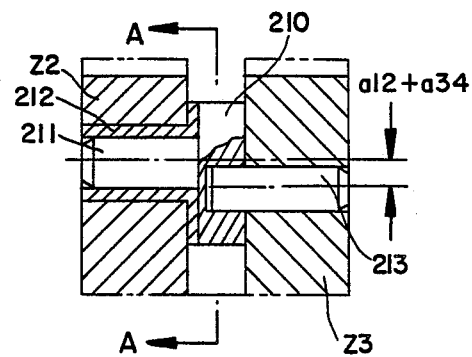
FIG. 25 is the front sectional view of an alternative of the planetary rotational delivery mechanism in accordance with the invention.
Figure 26:
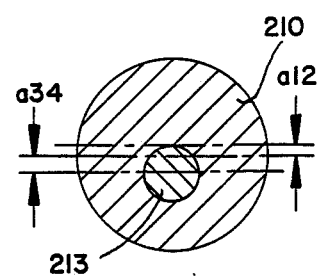
FIG. 26 is the sectional view of the mechanism shown in FIG. 25 taken along line A-A.

FIGS. 25 and 26 show another alternative of the planetary rotational delivery mechanism. If the eccentricity $a_{12} + a_{34}$ is relatively small, pin (211) and planet gear (210) are integrated together and inserted into sleeves (212) in close fit with gear $Z_2$. One end of pin (213) is inserted into the hole on gear $Z_3$ with close fit, while the other end is inserted into the hole on the planet gear (210) with running fit. The sleeve (212) and hole on the gear $Z_3$ are evenly distributed along circumferences formed by diameters $D_{Z3}$ and $D_{Z2}$. Their sizing relations are similar to those of the planetary transmission mechanism shown in FIGS. 23 and 24.

Figure 27:
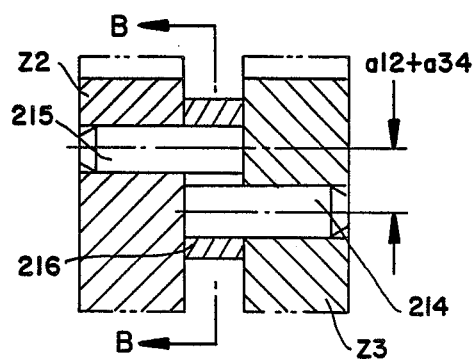
FIG. 27 is the front sectional view of another alternative of the planetary rotational delivery mechanism in accordance with the invention.
Figure 28:
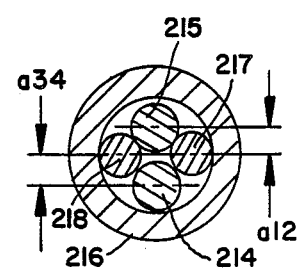
FIG. 28 is the sectional view of the mechanism shown in FIG. 27 taken along the line B-B.

FIGS. 27 and 28 show another alternative of the planetary rotational delivery mechanism. The arrangement of pins (214) and (215) is similar to that in the mechanisms shown in FIGS. 23 and 24. A planet wheel (216) is an elastic steel sleeve sleeved on the pins (214) and (215). Moreover, in the clearance formed between planet wheel (216) and pins (214) and (215) are inserted rollers (218) and (217).

Figure 29:
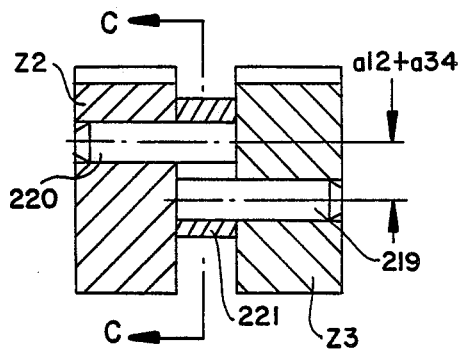
FIG. 29 is the front sectional view of another alternative of the planetary rotational delivery mechanism in accordance with the invention.
Figure 30:
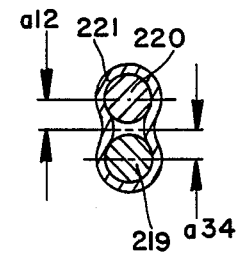
FIG. 30 is the sectional view of the mechanism shown in FIG. 29 taken along the line C-C.

FIGS. 29 and 30 show another alternative of the planetary rotational delivery mechanism. The arrangement of pins (219) and (220) is similar to that in the mechanisms shown in FIGS. 23 and 24. The planet wheel (221) is an elastic enveloped steel sleeve sleeved on pins (220) and (219).

Figure 31:
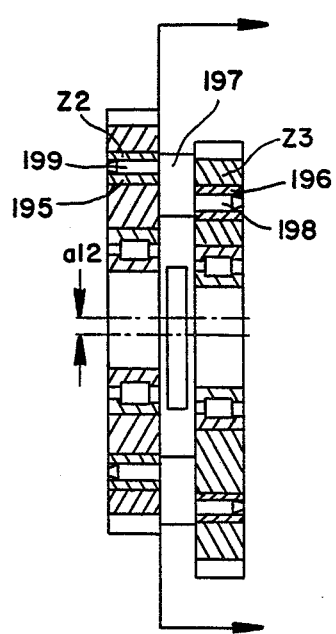
FIG. 31 is the front sectional view of the rotational crank delivery mechanism in accordance with the invention.
Figure 32:
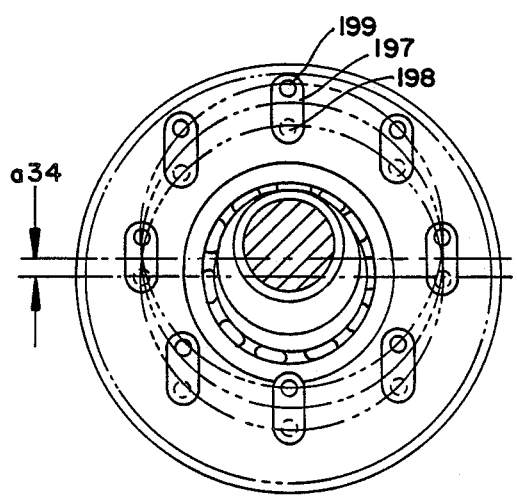
FIG. 32 is the side view of the mechanism shown in FIG. 31.

FIGS. 31 and 32 show the constructional diagrams of the crank rotational delivery mechanism. The gears $Z_2$ and $Z_3$ are respectively mounted on two eccentric bearings of eccentrics with eccentricities $a_{12}$ and $a_{34}$ respectively. A number of holes with sleeves (195) and (196) in them are evenly distributed along distribution circles $D_{Z2}$ and $D_{Z3}$ on gears $Z_2$ and $Z_3$. The eccentrics (198) and (199) on both ends of the cranks (197) are respectively inserted into the corresponding holes on the two gears and with running fit. The sizing relations between them should obey the following formulas:

$$D_S = a_{12} + a_{34};$$

$$D_Z = D_{Z2} = D_{Z3}.$$

Where
$D_S$—distance between the axles of two crank axles of the crankshaft;
$D_{Z2}$—diameter of the hole distribution circle on the gear $Z_2$;
$D_{Z3}$—diameter of the hole distribution circle on the gear $Z_3$;
$D_Z$—diameter of the orbital circle formed by the revolution of the crankshaft center.

Figure 33:
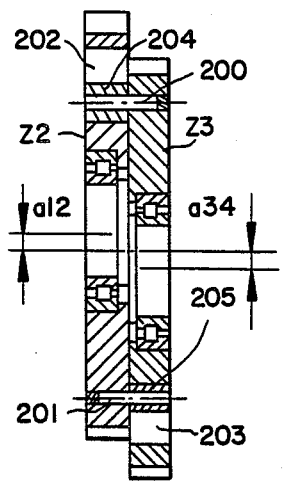
FIG. 33 is the front sectional view of the pin axle and pin sleeve rotational delivery mechanism in accordance with the invention.

FIG. 33 shows the constructional diagram of the pin axle and pin sleeve rotational delivery mechanism. The gears $Z_2$ and $Z_3$ are respectively mounted on two eccentric bearings of an eccentric shaft. On gears $Z_2$ and $Z_3$ are evenly distributed n pins (200) and (201) as well as n round holes (202) and (203). On the pins (200) fixed to the gear $Z_3$ are mounted pin sleeves (204) which are inserted into the holes (202) of $Z_2$. Conversely, on pins (201) fixed to the gear $Z_2$ are mounted pin sleeves (205) which are inserted into holes (203) of gear $Z_3$. The sizing relations between them should obey the following formula:

$$D = d_T + a_{12} + a_{34} + \delta.$$

D—hole diameter on gears $Z_2$, $Z_3$;

$d_T$—pin sleeve diameter on gears $Z_2$, $Z_3$;

$\delta$—tolerance for machining assembly.

I claim:
1. A planetary transmission mechanism of involute gears with compound small tooth-difference, comprising an eccentric shaft with first and second eccentric axles, first and second internal gear drives, an output shaft coaxial with said eccentric shaft, and a rotational delivery mechanism, wherein each of said internal gear drives comprises an internal gear and a planetary gear, said planetary gears of said first and second internal gear drives being rotatably sleeved on said first and second eccentric axles respectively and coupled to each other by said rotational delivery mechanism, and the internal gear of said first internal gear drive being stationary, while the internal gear of said second internal gear drive is fixed to said output shaft, wherein said rotational delivery mechanism is a planetary rotational delivery mechanism, a crank rotational delivery mechanism, a drive disk rotational delivery mechanism, or a pin and pin hole rotational delivery mechanism.

2. The mechanism as claimed in claim 1 wherein said gears of each of said internal gear drives has a tooth-difference of 5 to 8 teeth.

3. The mechanism as claimed in claim 1, wherein said planetary rotational delivery mechanism comprises pins evenly distributed on said planetary gears and a planet wheel or elastic steel sleeves or elastic enveloped steel sleeves, or otherwise comprises pins integrated with a planet wheel inserted into sleeves distributed evenly on said first planetary gear, while other pins are inserted into holes distributed evenly on said second planetary gear with one end inserted into holes on said planet wheel.

4. The mechanism as claimed in claim 1, wherein said second planetary gear is replaced by a stepped gear, said second internal gear is replaced by first and second internal floating gears, said first internal floating gear being in mesh with one of said stepped gears, said second internal floating gear being in mesh with the other of said stepped gears and said first and second internal floating gears floating by themselves such that when said first internal floating gear is stationary, said second internal floating gear is rotatable.

5. A single-stage double-axle reducer relating to a gear reducer and consisting of a housing, an eccentric shaft with first and second eccentric axles, an internal gear drive, a planetary rotational delivery mechanism, and an output shaft mounted on said housing through bearings, a first internal gear being fixed to said output shaft, said eccentric shaft being fitted into an inner hole of said output shaft through bearings and fixed on an end cover on said housing, first and second planetary gears being respectively mounted on said first and second eccentric axles through second internal gear being fixed on said housing, said first planetary gear being internally meshed with said first internal gear, said second planetary gear being internally meshed with said second internal gear and said planetary rotational delivery mechanism being connected between said first and second planetary gears.

6. The reducer as claimed in claim 3, wherein said eccentric shaft incorporates a binary direction balancing mechanism.

7. The reducer as claimed in claim 5, wherein said reducer is connectible in tandem with a cylindrical helical external gear reducer mechanism or a bevel gear reducer or a planet gear reducer or two single-stage reducers to form a multi-stage reducer.

8. The reducer as claimed in claim 5, wherein said output shaft is a hollow sleeve through which a drive shaft passes, with its one end fixed to a disk with n evenly spaced holes, and one end of each of a plurality of pins of a planet wheel rotational delivery mechanism being inserted into a corresponding one of a plurality of pin holes of as planet wheel, while the other end of said each of said plurality of pins is inserted into a corresponding one of a plurality of holes on a disk.

9. The reducer as claimed in claim 5, wherein said drive disk is a first external gear and ends of two output shafts extended into said housing are fixed to second and third external gears which are in mesh with said first external gear.

10. A planetary speed transmission related to a gear speed transmission and incorporating a housing, an eccentric shaft with first and second eccentric axles, an internal gear drive and a rotational delivery mechanism, wherein a shoulder of a first internal gear is mounted on a first bearing seat, said eccentric shaft is mounted through a first bearing into the recess of said first internal gear which is concentric with said shoulder of said first internal gear, the other end of said eccentric shaft being mounted through a second bearing into a second bearing seat of said housing, a first planetary gear and first and second integrated gears being mounted respectively through third, fourth and fifth bearings onto the outside of said eccentric axles, a second internal gear with a plurality of end face clutch teeth therein being fastened on a sleeve which is sleeved, in turn, onto the shoulder of said first bearing seat concentric with said eccentric shaft, a third internal gear with a plurality of end face clutch teeth being mounted through sixth and seventh bearings on the outside of said second bearing seat and coaxial with said eccentric shaft, said first internal gear, said first planetary gear, said first integrated gear, said second internal gear, said second integrated gear, and said third internal gear bearing in mesh respectively, said planetary rotational delivery mechanism being connected between said first integrated gear and said first internal gear, one end with a block in it of a shaft of a semiclutch mounted on the outside of said housing extends into a space between said end face clutch teeth, and by rotating said shaft, said clutch teeth may be obstructed, whereby the rotation of said third internal gear or said second internal gear is braked.

11. The reducer as claimed in claim 10, wherein one rotor shaft o said semiclutch penetrates into the hole of a disk and is running fit therein, a shoulder and a retainer collar confine said rotor shaft to rotate only without axial movement, the end with a block in said rotor shaft enters between said end face clutch teeth, said rotor shaft being further sleeved with a spring seat whereupon a through hole and a notch are opened, a plurality of steel balls and a spring hole, a spring shield with a plurality of notches protrudes into the top of said spring seat and by means of an adjusting nut is connected therein to press or release said spring, a pressing cover confines said spring seat on said disk to rotate only without longitudinal movement, said pressing cover and said disk being screwed to said housing, said steel balls are pressed in the positioning slot of said disk under the action of said spring, and a handle is mounted on top of said rotor shaft and pivotedly protrudes into said notch of said spring seat.

* * * * *